US010685103B2

(12) United States Patent
Grammer et al.

(10) Patent No.: US 10,685,103 B2
(45) Date of Patent: Jun. 16, 2020

(54) CHALLENGE AND RESPONSE SYSTEM FOR IDENTIFYING NON-CREDENTIALED OCCUPANTS AND METHOD

(71) Applicant: Tyco Fire & Security GmbH, Neuhausen am Rheinfall (DE)

(72) Inventors: George Grammer, West Palm Beach, FL (US); Teri Rumble, Jensen Beach, FL (US); Graeme Jarvis, Marblehead, MA (US); Christopher Cianciolo, Westford, MA (US)

(73) Assignee: Tyco Fire & Security GmbH, Victor Von Bruns-Strasse (CH)

( * ) Notice: Subject to any disclaimer, the term of this patent is extended or adjusted under 35 U.S.C. 154(b) by 207 days.

(21) Appl. No.: 15/586,998

(22) Filed: May 4, 2017

(65) Prior Publication Data

US 2018/0322268 A1 Nov. 8, 2018

(51) Int. Cl.
*H04L 29/06* (2006.01)
*G06F 21/35* (2013.01)
(Continued)

(52) U.S. Cl.
CPC ............ *G06F 21/35* (2013.01); *G07C 9/257* (2020.01); *G07C 9/27* (2020.01); *G07C 9/28* (2020.01);
(Continued)

(58) Field of Classification Search
None
See application file for complete search history.

(56) References Cited

U.S. PATENT DOCUMENTS 8,973,095 B2* 3/2015 Smith .................... G06F 21/36
726/2
9,783,159 B1* 10/2017 Potter .................... G08B 21/02
(Continued)

OTHER PUBLICATIONS

Howry, Dolores et al. Evolution of Trust Systems from PCs to Mobile Devices: Building Secured and Trusted Ecosystems. IEEE Vehicular Technology Magazine, vol. 8, Issue: 1. https://ieeexplore.ieee.org/stamp/stamp.jsp?tp=&arnumber=6470762 (Year: 2013).*
(Continued)

*Primary Examiner* — Jeremiah L Avery
(74) *Attorney, Agent, or Firm* — HoustonHogle LLP

(57) ABSTRACT

A system and method for determining authorization of individuals at a premises is disclosed. The system (e.g. security system) includes interrogator devices such as mobile computing devices that are carried through the premises by an interrogator. The interrogator devices send challenge beacons for triggering responses from target user devices carried by users. A management system then confirms whether users of the target user devices are authorized users based on the responses received by the interrogator devices. Examples of target user devices include mobile computing devices such as smart phones/tablet devices, and auxiliary devices such as smart badges and wallets. In embodiments, the interrogator can also carry an auxiliary device having an integrated camera system that captures image data of the users, where the management system additionally confirms whether the users are authorized by comparing the image data along with information in the responses to stored records of authorized users.

20 Claims, 12 Drawing Sheets

(51) Int. Cl.
*H04B 5/00* (2006.01)
*G08B 13/196* (2006.01)
*G07C 9/27* (2020.01)
*G07C 9/28* (2020.01)
*G07C 9/25* (2020.01)

(52) U.S. Cl.
CPC ..... *G08B 13/19613* (2013.01); *H04B 5/0056* (2013.01)

(56) References Cited

U.S. PATENT DOCUMENTS

| | | | |
|---|---|---|---|
| 9,939,784 B1* | 4/2018 | Berardinelli | G04B 37/1486 |
| 10,025,308 B1* | 7/2018 | Poursohi | G06K 9/6289 |
| 2003/0115474 A1* | 6/2003 | Khan | G06F 21/32 |
| | | | 713/186 |
| 2005/0002530 A1* | 1/2005 | Kogan | G07C 9/22 |
| | | | 380/255 |
| 2006/0116555 A1* | 6/2006 | Pavlidis | A61B 5/01 |
| | | | 600/300 |
| 2014/0214688 A1* | 7/2014 | Weiner | G06Q 20/3227 |
| | | | 705/71 |
| 2015/0269369 A1* | 9/2015 | Hamid | G06F 21/31 |
| | | | 726/5 |
| 2016/0080943 A1* | 3/2016 | Ives-Halperin | G06Q 20/3274 |
| | | | 713/168 |
| 2016/0225203 A1* | 8/2016 | Asmar | G07C 9/00309 |
| 2017/0123487 A1* | 5/2017 | Hazra | G06F 3/015 |

OTHER PUBLICATIONS

Mumba, Emilio Raymond; Venter, H.S. Mobile Forensics using the Harmonised Digital Forensic Investigation Process. 2014 Information Security for South Africa. https://ieeexplore.ieee.org/stamp/stamp.jsp?tp=&arnumber=6950491 (Year: 2014).*

* cited by examiner

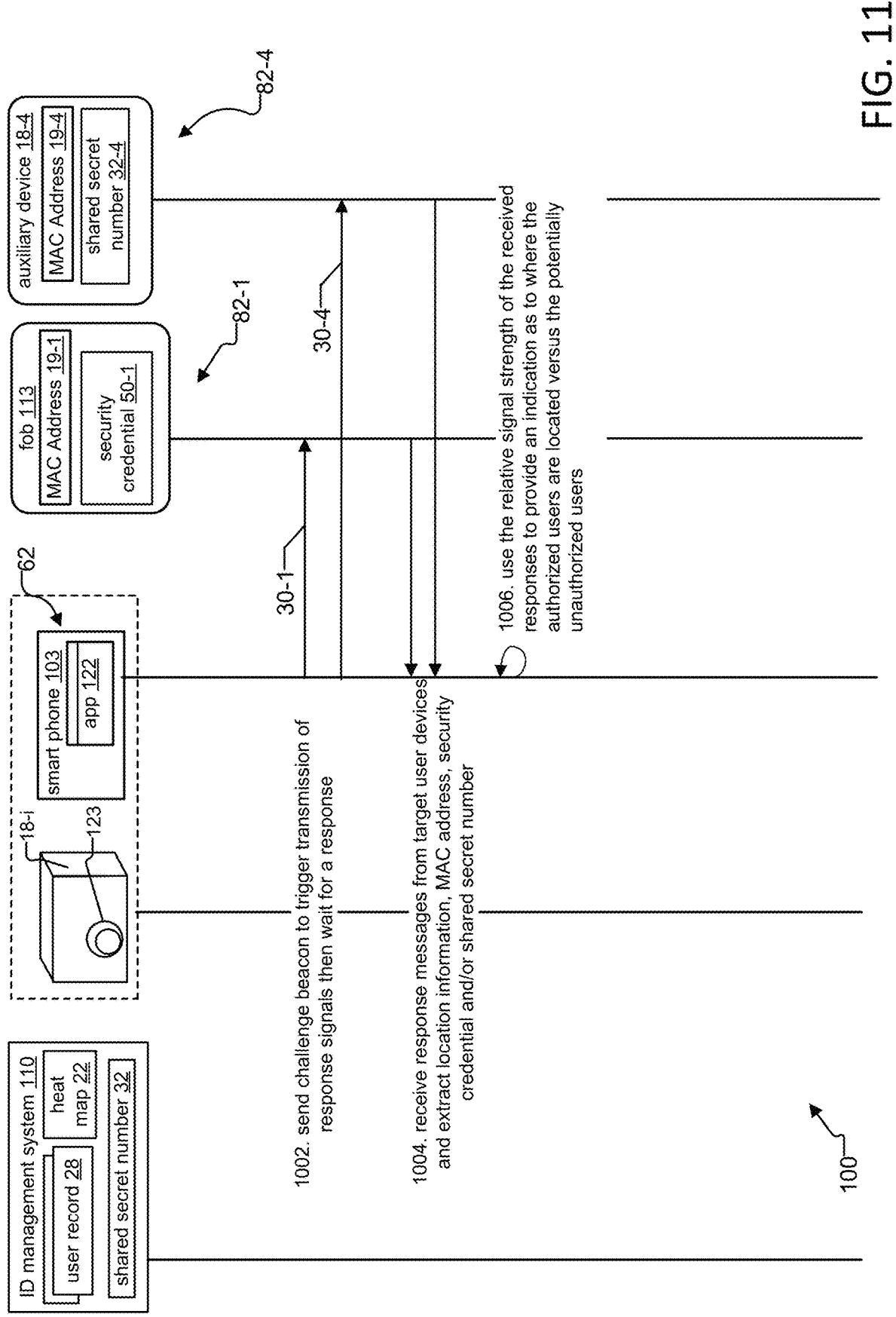

CHALLENGE AND RESPONSE SYSTEM FOR IDENTIFYING NON-CREDENTIALED OCCUPANTS AND METHOD

BACKGROUND OF THE INVENTION

Security systems are often installed within and around a premises such as commercial, residential, or governmental buildings. Examples of these buildings include offices, hospitals, multi dwelling units, warehouses, schools or universities, shopping malls, government offices, and casinos. The security systems typically include components such as security panels, motion sensors, access control systems, surveillance cameras, image analytics systems, and/or network video recorders (NVRs), to list a few examples.

Traditional access control systems in buildings are principally concerned with physical security and the selective access to, restriction of, and/or notification of access to a place or other resource. The main components of many access control systems are access readers and possibly door and elevator controllers. The access card readers are often installed to enable presentation of credentials to obtain access to restricted areas, such as buildings or areas of the buildings. The readers are installed near access points, such as interior and exterior doors, hallways, and/or elevators.

Typically, individuals interact with the access card readers of the access control systems by presenting an access badge at the reader. The access badge includes credentials (e.g. username and password) associated with a particular user and typically takes the form of a keycard or contactless smart card. For a keycard access badge, the user presents the keycard at the reader by "swiping" a magnetic strip of the keycard against the reader, while the smart card access badge is presented within range (approximately 2-3 inches or 5 centimeters) of the reader. The access card readers read the credential information of the access badge and validate the information possibly by reference to an ID management system that confirms the credentials and determines whether the individuals are authorized to access the restricted areas. If the individuals are authorized, then the access card readers might signal a door controller to unlock doors or not generate alarms, for example.

The access badges also have historically included a picture of the authorized user. The picture is often printed directly upon a face of the access badge and the user typically wears the access badge on their person with the picture displayed, such as attached to clothing of the user. This allows security personnel and other employees to have a cursory visual confirmation that the individual carrying the badge is, in fact, the person to whom the access badge was issued.

More recently, frictionless access control systems have been proposed. These security systems typically rely on individuals carrying wireless user devices. The wireless user devices might be dedicated fob devices and/or personal mobile computing devices such as tablet or smart phone computing devices. The wireless user devices communicate with access readers installed at access points. As the user with the wireless user device approaches the access points, user credentials are transmitted to the access card readers that validate the credentials and determine whether the user is authorized to pass through the access point. The access point, such as a door, can then be unlocked, for example.

SUMMARY OF THE INVENTION

Traditional access control systems have limitations. These access control systems are limited by the fact that they tend to provide perimeter-based security. Their focus is controlling movement through access points. These systems typically provide security challenges to individuals only when they come within proximity of or otherwise interact with a fixed reader. Moreover, if an access card for an authorized user is stolen, an impostor individual carrying the stolen access card may be able to obtain access to an access point until the card is reported as stolen and deactivated by security personnel.

The present invention, in contrast, concerns a distributed security system and method for authorizing individuals within or at a premises that can overcome some of the limitations of existing access control systems. Unlike existing access control systems that typically provide a security challenge only when the individuals attempt to access a controlled physical resource or come within proximity of a controlled physical boundary, the proposed security system can be used to automatically and continuously challenge and authorize occupants of a building as they come into proximity with other occupants.

The proposed system includes an interrogator device, which might be a mobile computing device such as tablet or smartphone computing device or dedicated smart badge, that broadcasts, possibly continually, a challenge beacon to user devices carried by other building occupants. The interrogator devices might be carried through the premises by any number of authorized users and/or agents of the security system. Then, based on the responses or lack of responses of the user devices, the proposed system can conclude whether the user devices and/or the respective users are authorized for their current location within the premises.

In general, according to one aspect, the invention features a system for determining authorization of individuals at a premises. The system includes interrogator devices and a management system. The interrogator devices are carried through the premises and might be mobile computing devices like smartphones or dedicated smart badges. They send challenge beacons for triggering responses from target user devices. The management system confirms whether users of the target user devices are authorized based on the responses received by the interrogator devices.

Typically, the interrogator devices initially conclude whether users of the target user devices are authorized based on the responses from the target user devices. The system also includes auxiliary devices that are carried with the interrogator devices that capture image data of the users carrying the target user devices. The management system can additionally confirm whether users of the target user devices are authorized based on the image data. In one example, security personnel can use the image data of the user captured by the auxiliary devices to detect impostors attempting to access the security system using stolen access cards of otherwise authorized users.

Preferably, the management system notifies the interrogation devices in response to confirming whether users of the target user devices are authorized.

In one embodiment, the auxiliary devices that are carried with the interrogator devices receive messages sent from the interrogator devices indicating whether the users of the target user devices are authorized. The auxiliary devices can then provide an indication as to whether the users of the target user devices are authorized in response to receiving the messages. In one example, the auxiliary devices receive the messages from the interrogator devices over a Bluetooth Low Energy (BLE) link.

In one implementation, the interrogator devices provide location information of the target user devices, and wherein the management system determines whether the target user devices of the users are authorized based on the location information. The interrogator devices can use a relative signal strength of the received responses to provide an indication as to where the authorized users are located versus potentially unauthorized users.

In different examples, the interrogator devices are carried by robots, security personnel and/or users.

Additionally, the responses received by the interrogator devices can include information which indicates that the users of the target user devices are authorized at the premises for a particular day and/or time period.

In general, according to another aspect, the invention features a method for determining authorization of individuals at a premises. The method includes, for interrogator devices that are carried through the premises, sending challenge beacons from the interrogator devices for triggering responses from target user devices. The method also includes confirming whether users of the target user devices are authorized based on the responses received by the interrogator devices.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 11 is a schematic diagram that illustrates operation of the security system of FIG. 10.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms of the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1A:
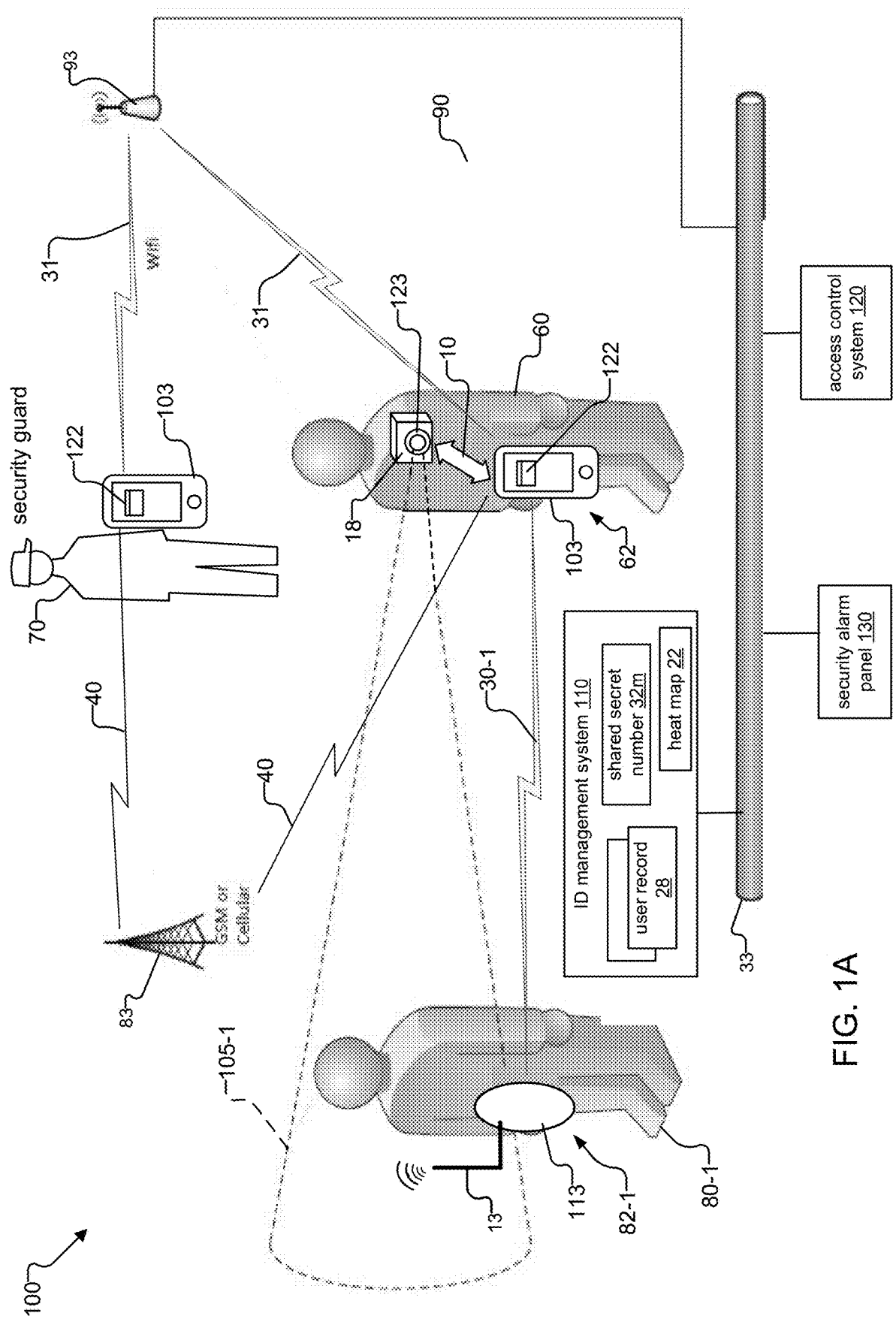
FIG. 1A is a schematic diagram showing an exemplary interaction between an interrogator device carried by an interrogator individual and a user carrying a target user device, where the interrogator device is part of a distributed security system at a premises that determines whether the user is authorized.

FIG. 1A shows an example of an interaction between an exemplary interrogator device 62 and a user 80-1 carrying a target user device 82-1 in a distributed security system 100, which has been constructed according to the principles of the present invention. The interrogator device 62 and the target user device 82 are preferably mobile computing devices 103 such as smart phones, tablet computing devices, and laptop computers, in examples. These devices might run operating systems such as Windows, Android, Linux, or Apple IOS, in examples. Applications, or "apps" 122 then execute on top of the operating systems of the devices. Additionally and/or alternatively, the mobile computing devices can also be a "smart card" that could be a physical battery operated or externally powered credential that responds to an interrogation. The smart card responds to an interrogation because it has been configured as a network device or otherwise has wireless networking capabilities that enable the reception of radio frequency (RF) signals and the ability to respond to RF signals.

In more detail, an interrogator 60 individual is carrying the interrogator device 62. Both the interrogator 60 and the user 80-1 can be wandering through the building 90 in any spot or location. Examples of these buildings include offices, hospitals, multi dwelling units, warehouses, schools or universities, shopping malls, government offices, and casinos. The interrogator devices 60 challenge the users 80 as the target user devices 82 carried by the users 80 come within proximity of the interrogator devices 60. In one example, the interrogator device 62 is a mobile computing device such as a tablet device or a smart phone 103 running firmware and optionally one or more applications, or "apps" 122.

In the illustrated example, the interrogator device 62 challenges user 80-1 by sending challenge beacons 30-1 to a target user device 82-1 carried by the user 80-1. A challenge beacon 30 is a wireless radio frequency (RF) encoded message, such as a 2.4 GHz Bluetooth Basic Rate (BR) or Low Energy signal message, in one example. Bluetooth Low Energy is also known as BLE. In other examples, the challenge beacon 30 can be a proprietary RF encoded message, a message based on 802.15.4 (e.g. Zig-Bee), or an RF message using wide bandwidth transmission such as ultra-wide band (UWB) or spread spectrum techniques.

Security personnel 70 configure the interrogator devices 62 and the target user devices 82 to both transmit and receive the challenge beacons 30 prior to assigning the devices 62/82 to authorized users 60/80. This is because the roles of interrogator 60/interrogator device 62 and user 80/target user device 82 can change as each encounters another at the building 90, in one embodiment. The security personnel 70 typically modify firmware of the devices 62/82 and/or update apps 122 executing on the devices 62/82 to transmit and "listen" for the challenge beacons 30.

The target user devices 82 receive and respond to the challenge beacons 30 with a similar RF encoded message. Upon apps 122 and/or firmware of the target user devices 82 receiving the challenge beacons 30, in one example, the apps 122 and/or firmware identify unique identifiers or signal patterns included within the challenge beacons 30. The reception of the challenge beacons 30 then triggers responses from the target user devices 82 back to the interrogator device 62. The responses, in examples, can include a unique data pattern or emit signals of a nature that the interrogator devices 62 expect to receive from the target user devices 82. The challenge beacons 30 can be company-specific and can even be specific to different buildings of an office complex or to individual floors or areas within the same building 90, in examples.

The interrogator 60 is also carrying an auxiliary device 18, in the illustrated embodiment. Examples of auxiliary devices include "smart badges" worn conspicuously on the person of an individual and smart wallets. Smart badges are limited functionality mobile computing devices that are typically worn near a person's neck, or on a person's arm or belt.

In one embodiment, the auxiliary device 18 includes a camera system 123 that can capture images of the user 80-1 within a field of view 105-1 of the camera system 123. The auxiliary device 18 and the interrogator device 62 communicate via a close-range wireless link 10 such as a near-field communications (NFC) link, Bluetooth Low Energy (BLE) link, or proprietary wireless RF link, in examples.

A wireless access point 93 might also be provided to support wireless links 31 that enable wireless data transfer between the interrogator device 62 and a smart phone 103 carried by a security guard 70. In one example, the wireless links 31 are IEEE 802.11-based links, such as "WiFi." The smart phone 103 of the security guard 70 and the smart phone 103 functioning as the interrogator device 62 also can communicate via cellular and/or satellite links 40, such as via a Global System for Mobile Communications (GSM) link. The cellular and/or satellite links 40 are provided by an associated transmission facility 83 such as a cellular tower or satellite.

The security system 100 can also determine locations of the users 82 and thus the target user devices 82 carried by the users 80. Examples of technologies that the security system 100 can use to locate and possibly track the target user devices 82 within or at the building 90 include satellite-based Global Positioning System (GPS) tracking, WiFi tracking using received signal strength indication (RSSI) information from WiFi-based access points 93, motion/machine vision tracking technologies such as Google Tango, or by using the triangulation of WiFi signals 31, Bluetooth stations and cellular antennas 83 to track the target user devices 82 of the users 80. Tango is a registered trademark of Google, Inc.

In one example, a wireless fob 113 functions as the target user device 82-1. The wireless fob 113 has an antenna 13 which enables the fob 113 to communicate with the interrogator device 62, where the wireless fob 113 receives the challenge beacons 30-1 via its antenna 13.

The ID management system 110 stores user records 28 of authorized users, and includes a shared secret number $32m$ and a heat map 22. The shared secret number $32m$ functions as a "master" shared secret number to which shared secret numbers included in other devices such as target user devices 82 can be compared against.

The security system 100 can also be integrated with a traditional access control system 120 that communicates over a local network 33 with the ID management system 110. A frictionless access control system 120, in one example, can provide perimeter-based security based on readers at fixed locations, which augments the location-independent/distributed user authorization capabilities of the security system 100.

Additionally, the security system 100 can be integrated with a security alarm panel 130 and/or access controller that collects alarm data. The security alarm panel 130/access controller also communicates over the local network 33. In response to the interrogator devices 62 in conjunction with the ID management system 110 determining that a user 80 is unauthorized, for example, the interrogator devices 62 and/or the ID management system 110 can send signals associated with detection of the unauthorized user over the local network 33 to the security alarm panel 130. The security alarm panel 130, in turn, can then notify security guards 70 in response, and/or send signals over the local network 33 to the access control system 120 to lock any access points such as doors near the location of the unauthorized user 80, in examples.

Figure 1B:
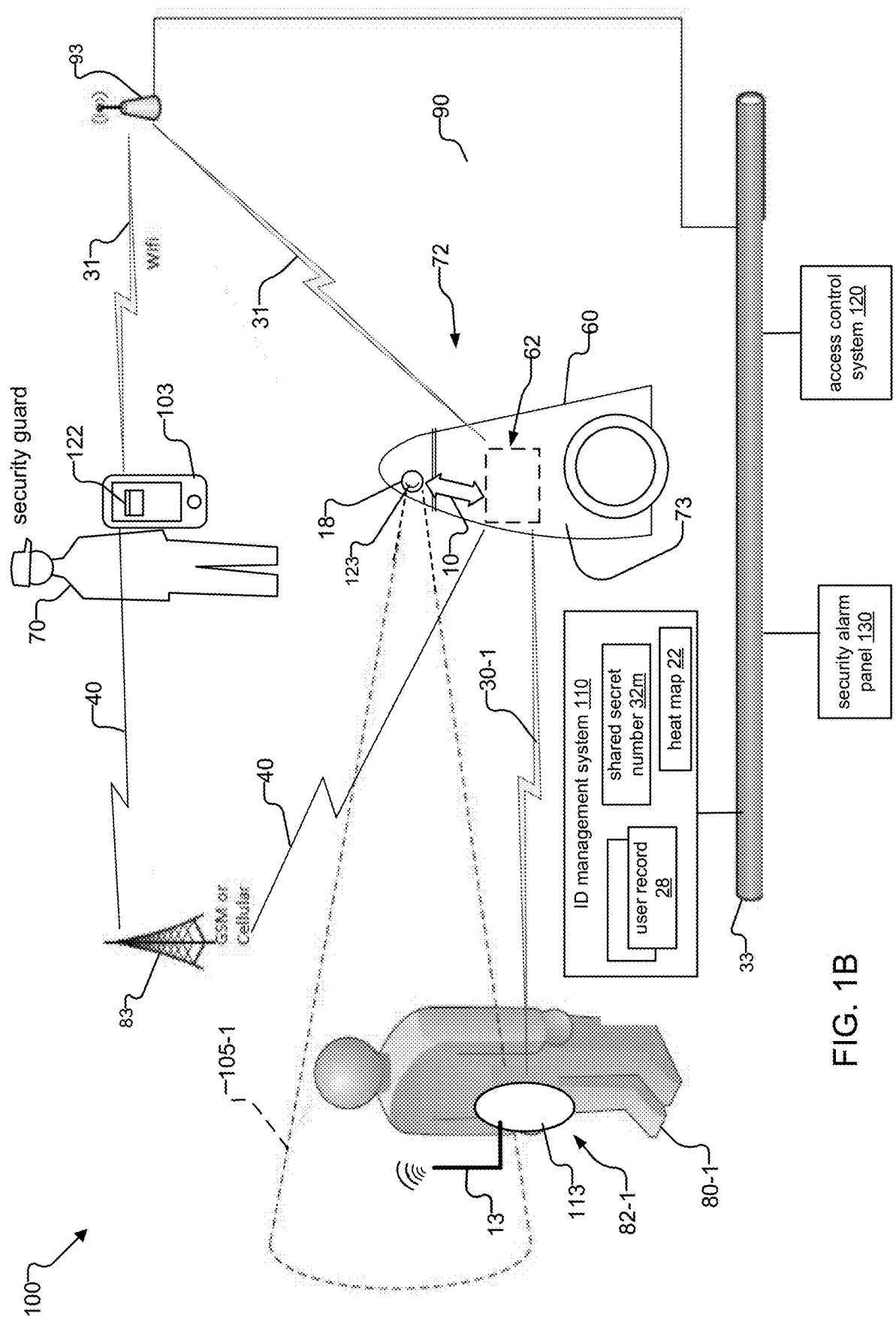
FIG. 1B is a schematic diagram showing another interaction between an interrogator device and a user in the security system, where the interrogator device is carried by a robot as the interrogator.

FIG. 1B shows another interaction between an interrogator device 62 and a user 82-1 in the security system 100. Instead of a person being the interrogator 60 as in FIG. 1A, the interrogator 60 in FIG. 1B is an autonomous data machine such as a security robot 72 that moves through the building 90. Instead of relying on employees, for example, the security robots 72 can roam and patrol locations within the building 90. The robots 72 can potentially operate in a 24×7 capacity and can also be deployed in locations that are difficult or unsafe for human interrogators 60 to access, in examples. Security personnel can configure the robots 72 to monitor users 80 by continually requesting their credentials and then approaching the user 80 as needed.

In the illustrated example, the robot 72 functions as both the interrogator 60 and the interrogator device 62. The interrogator device 62 can be a mobile communications device that is similar to a smart phone 103 in its capabilities but is typically integrated as part of the computer and communications systems of the robot 72. The robots 72 also include built-in interrogation protocols. The robot 72 also typically includes an integrated auxiliary device 18 having a camera system 123.

The robot 72 can also be part of an Artificial Intelligence (AI) system optionally integrated with the security system 100. The machine intelligence provided by the AI system in conjunction with a robot 72 as the interrogator/interrogator device 60/62 can augment the capabilities of the security system 100 by "learning" what is normal so the security system 100 can identify unusual, and potentially harmful, behavior that a human interrogator 60 alone may miss.

A housing 73 of the robot 72 provides a protective shell over the integrated interrogator device 62, auxiliary device 18, and other computing and communications equipment of the robot 72.

Figure 2:
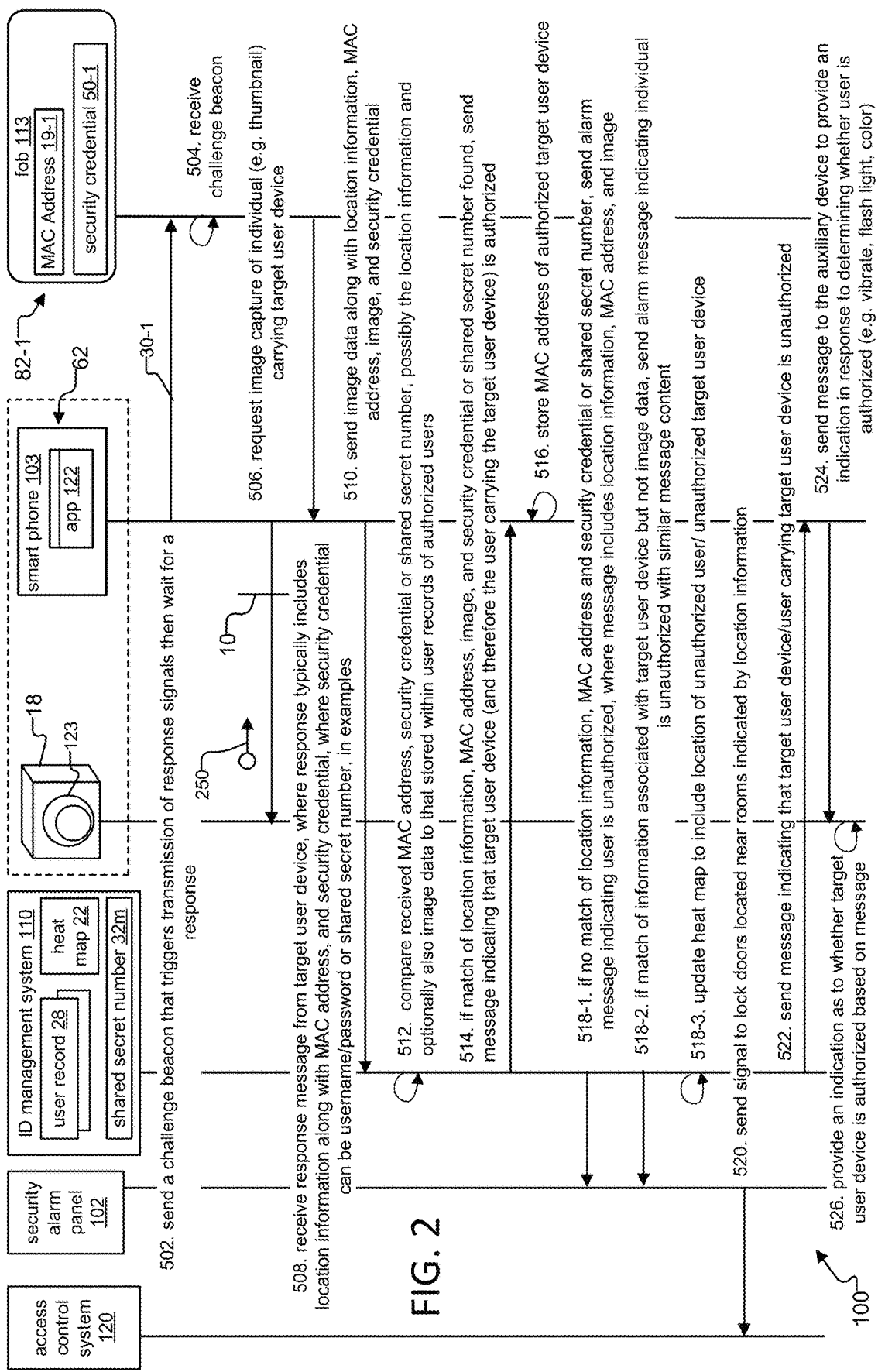
FIG. 2 is a sequence diagram that illustrates operation of the security system of FIG. 1A.

FIG. 2 is a sequence diagram that illustrates operation of the exemplary security system 100 of FIGS. 1A/1B. Here, the diagram shows how an interrogator 60 carrying an interrogator device 62 sends a challenge beacon 30 for triggering a response in a target user device 82-1 carried by user 80-1. The ID management system 110 then confirms whether the user 82-1 of the target user device 80-1 is authorized based on the responses to the challenge beacons 30-1 sent by the target user device 82-1 and received by the interrogator device 62.

In the illustrated example, fob 113 functions as the target user device 82-1 and includes a unique physical ID such as a Media Access Control (MAC) or Bluetooth address 19-1 and a security credential 50-1. In response to the ID management system 110 confirming that user 82-1 carrying target user device 80-1 is unauthorized, in one example, the ID management system 110 sends a message to this effect back to the interrogator device 62, sends alarm messages to a security alarm panel 102, and updates a heat map 22 to include location information of the unauthorized user 82-1.

FIG. 2 also illustrates operation of auxiliary devices 18 that are additionally carried by an interrogator 60. The auxiliary devices 18 can capture image data 250 of the users 80 carrying the target user devices 82. Then, the ID management system 110 can additionally confirm whether the users 80 of the target user devices 82 are authorized based on the image data 250.

The auxiliary devices 18 also receive messages sent from the interrogator devices 62 indicating whether the users 80 of the target user devices 82 are authorized. The auxiliary devices 18 can then provide an indication (e.g. flash a light pattern, display a certain color) as to whether the users 80 of the target user devices 82 are authorized in response to receiving the messages.

In step 502, the interrogator device 62 (e.g. smart phone 103) sends a challenge beacon 30-1 that triggers transmission of responses from a target user device 82-1. The interrogator device 62 then waits for a response, typically in the form of a message or perhaps even a signal. The interrogator devices 60 can initially conclude whether users 80-1 of the target user devices 82-1 are authorized based on the responses from the target user devices 80-1 to the challenge beacon 30-1.

In one example, the response message includes a pattern or sequence that is unique to all target user devices 82 authorized for use at the building 90. Such a pattern or sequence can be updated "on demand" such as being wirelessly pushed to the target user devices based on security objectives, such as in response to a security guard 70 determining that a target user device 82 for an authorized user 80 was recently reported as missing or stolen. According to step 504, the target user device 82-1 receives the challenge beacon 30-1.

Then, in step 506, the interrogator device 62 sends a request to capture image data 250 of the user 80-1 carrying the target user device 82-1, where the request is sent over the local wireless link 10 to the auxiliary device 18 carried by the interrogator 60. The auxiliary device 18, via its camera system 123, captures image data 250 of the user 82-1 and sends the image data 250 over the local link 10 back to the interrogator device 62.

In other examples, the auxiliary device 18 continuously captures images and performs image recognition on the captured images. Then, when individuals are detected in the images by the auxiliary device 18, the auxiliary device 18 signals the interrogator device, which, in response, sends the challenge beacon 30-1.

In step 508, the interrogator device 62 receives the response message from fob 113 functioning as the target user device 82-1, where the response typically includes location information, MAC address 19-1 and a security credential 50-1. The security credential 50-1 can be a username/password or other security identifier associated with user 80-1.

It is also important to note that the fob 113 could include a shared secret number 32 instead of/in addition to the security credential 50-1. The shared secret number 32 is typically a unique number "pushed" to each of the target user devices 82, the value of which is also copied to the "master" shared secret number 32*m* maintained within the ID Management system 110. The value of the shared secret numbers 32/32*m* are typically updated each workday or can be updated in real-time in response to security conditions. In another example, the security credential 50-1 includes a date and time interval which indicates that the user 80-1 of target user device 82-1 is authorized at the building 90 for a particular day and/or time period.

The interrogator device 62 extracts the location information, MAC/Bluetooth address 19-1, and security credential 50-1 or shared secret number 32 from the message, and in step 510, sends these items along with the image data 250 in a message to the ID management system 110 for further analysis.

Figure 3:
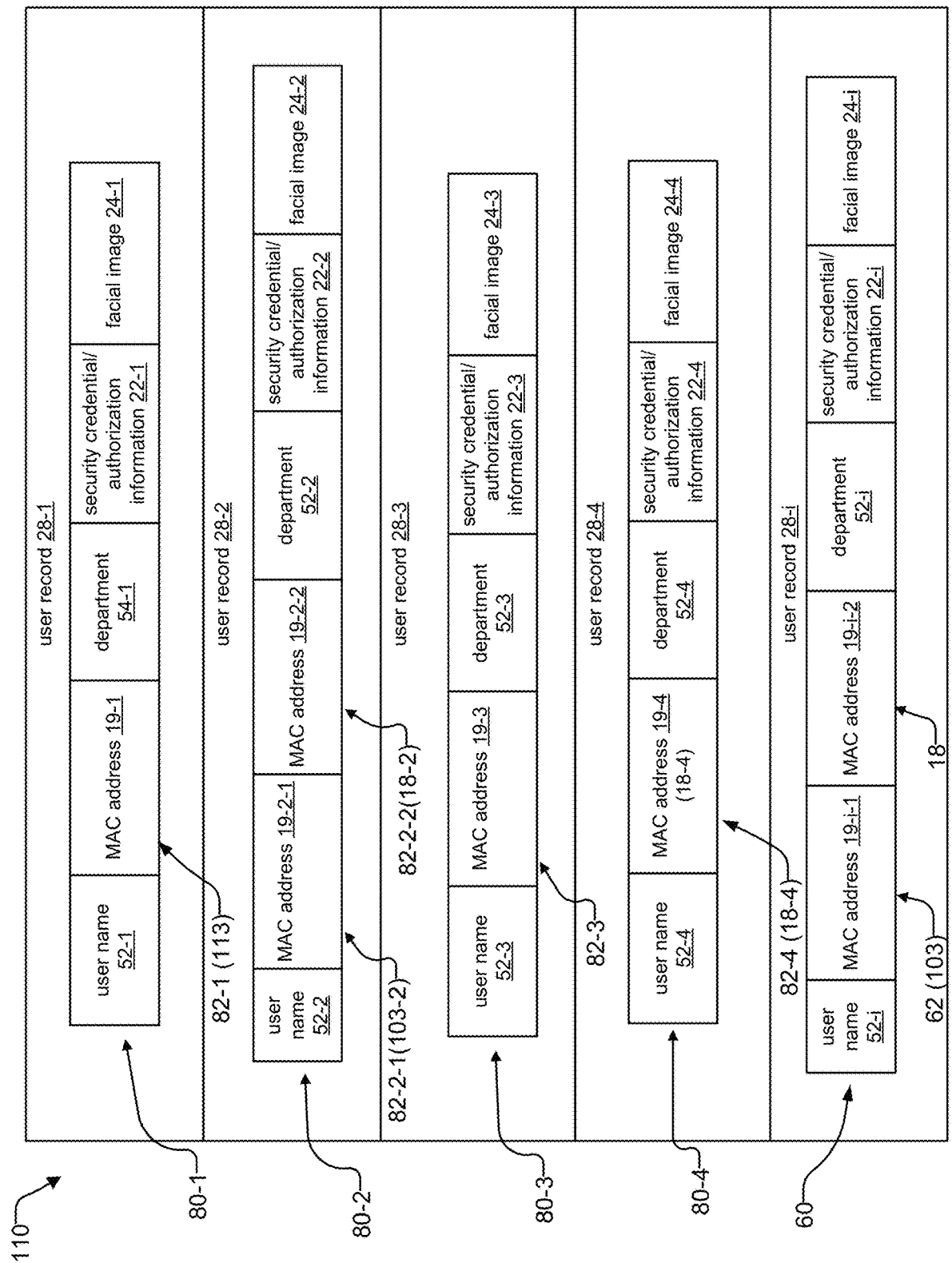
FIG. 3 shows exemplary user records of authorized users maintained by an ID management system of the security system.

FIG. 3 shows example user records 28 of authorized users 80 maintained by the ID management system 110. The user records 28 include information for authorized target user devices 82 carried by each of the authorized users 80.

User record 28-1 and 28-*i* store information for authorized users 80-1 and interrogator 60, respectfully, which were previously described in FIG. 1A/1B and FIG. 2. User records 28-2 through 28-4 store information for authorized users 80-2, 80-3, and 80-4, respectfully.

User record 28-1 is associated with user 80-1 and includes information for validating target user device 82-1 carried by user 80-1. User record 28-1 includes a user name 52-1, a unique physical ID such as a MAC address 19-1 (e.g. that of the fob 113 functioning as the target user device 82-1), a department 54-1, a security credential/authorization information 22-1, and optionally a facial image 24-1. Examples of a unique ID other than a MAC address include a Service Set Identifier (SSID) of a device that communicates via a wireless communications network such as WiFi 31, or a proprietary unique identifier.

User record 28-2 is associated with an authorized user 80-2 and includes information for validating both target user devices 82-2-1 and 82-2-2 carried by user 80-2. In examples, target user device 82-2-1 is a smart phone 103-2 and the target user device 82-2-2 is an auxiliary device 18-2. User record 28-2 includes a user name 52-2, a MAC address 19-2-1 for smart phone 103-2 as target user device 82-2-1, a MAC address 19-2-2 for auxiliary device 18-2 as target user device 82-2-2, a department 54-2, a security credential/ authorization information 22-2, and optionally a facial image 24-2.

In a similar vein, user record 28-3 is associated with an authorized user 80-3 and includes information for validating target user device 82-3 carried by user 80-3. User record 28-3 includes a user name 52-3, a MAC address 19-3 for target user device 82-3, a department 54-3, a security credential/authorization information 22-3, and optionally a facial image 24-3.

User record 28-4 is associated with authorized user 80-4 and includes information for validating target user devices 82-4 carried by user 82-4. User record 28-4 includes a user name 52-4, a MAC address 19-4 for an auxiliary device 18-4 as a target user device 82-4, a department 54-3, a security credential/authorization information 22-4, and optionally a facial image 24-4.

User record **28-*i* is associated with the interrogator 60 and includes information for validating both the interrogator device 62 and auxiliary device 18 carried by interrogator 60. User record 28-*i* includes a user name 52-*i*, a MAC address 19-*i*-1 (e.g. that of the smart phone 103 functioning as the interrogator device 62), a MAC address 19-*i*-2 (e.g. that of the auxiliary device 18), a department 54-*i*, a security credential/authorization information 22-*i*, and optionally a facial image 24-*i***.

It can also be appreciated that other types of information that is indicative of an authorized user 80 (and the target user device 82 carried by an authorized user 80) can be stored within the user records 28. In one example, location information can be stored in each user record 28 that indicates the locations (e.g. floors or individual rooms) to which the user devices 82 carried by the users 80 are authorized. The location information can also be combined with information indicating the times of the day within which the user devices 82 carried by the users 80 are authorized at each location, and a security clearance level of each user 80, in other examples.

Returning to FIG. 2, in step 512, the ID management system 110 compares the received MAC address 19-1, security credential 50-1 or shared secret number 32, possibly the location information and optionally also the image data 250 to that stored within user record 28-1 of authorized user 80-1. If a shared secret number 32 was received, the ID management system 110 compares the shared secret number 32 to its local or "master" shared secret number 32*m*. The received image data 250 can be a thumbnail of the user 80 or a series of images of the user 80, which the ID management system can compare against the stored facial image 24-1 in user record 28-1 for authorized user 80-1.

If a match of the location information, MAC address 19-1, image data 250, and security credential 50-1 or shared secret number 32-1 is found in step 514, the ID management system 110 sends a message back to the interrogator device 62 indicating that target user device 82-1 (and therefore the user 80-1 carrying the target user device 82-1) is authorized. In step 516, the interrogator device 62 stores a local copy of the MAC address 19-1 of the authorized target user device 82-1.

Additionally and/or alternatively, the ID management system 110 can determine whether the target user devices 82 of the users 80 are authorized based on the location information. For example, if the user record 28 of an authorized user includes location information indicating that user device 82 is authorized for floor 1 of a building 90, but the location information sent from the target user device 82 indicates that the device is located on floor 3, the ID management system 110 can conclude that the user 80 carrying the target user devices 82 is unauthorized (to access floor 3).

However, if no match of the location information, MAC address 19-1 and security credential 50-1 or shared secret number 32 is found in step 518-1, the interrogator device 62 sends a message to the security alarm panel 102 indicating that the user 80-1 is unauthorized, where the message includes location information, MAC address 19-1, and image data 250, in examples.

In step 518-2, if a match of the information associated with the target user device 82-1 is found (e.g. both the received MAC address 19-1 and security credential 50-1 and possibly the location information match that stored within user record 28-1) but the image data 250 does not match, the interrogator device 62 sends an alarm message to the security alarm panel 102 indicating that user 80-1 is unauthorized with similar message content. This can occur when a target user device 82 of an authorized user 80 is stolen or lost, and a person other than the authorized user 80 (i.e. an impostor) is moving through the building 90 while carrying the stolen or lost target user device 82.

In step 518-3, the ID management system 110 updates an electronic map such as a heat map 22 to include location information of target user devices 82-1 carried by unauthorized users 80-1. Upon receiving the alarm signal from the ID management system 110 indicating that user 80-1 is unauthorized, the security alarm panel 102 in step 520 can send a signal to the access control system 120. The signal instructs the access control system 120 to send signals to its door controllers to lock doors located near rooms indicated by the received location information, in one example.

Then, in step 522, the ID management system 110 sends a message back to the interrogator device 62 which indicates that the target user device 80-1 (and therefore that user 80-1 carrying the target user device 82-1) is unauthorized. The interrogator device 62 can display a text message or render an audible chime to this effect in response, in examples. The interrogator device 62 can also provide the image data 250 of the unauthorized user 80-1 to security personnel 70, such as by sending the image data 250 in an SMS text message over the cellular link 40 for display on the smart phone 103 of security guard 70.

According to step 524, the interrogator device 62 then sends a message over local link 10 to the auxiliary device 18. Based on whether the target user device 80-1 (and therefore whether the user 80-1 carrying the target user device 82-1) was determined to be authorized or unauthorized, the message can instruct the auxiliary device 18 to provide an indication in response. The message may include an instruction for the auxiliary device 18 to display a color, for example, where a luminescent band of the auxiliary device 18 displays the color red for an unauthorized user 80-1 or the color green for an authorized user 80-1. The message can also include an instruction to provide a vibration for an unauthorized user 80-1. In this way, the interrogator 60 is alerted to the presence of an unauthorized user 80-1.

In step 526, the auxiliary device 18 provides an indication as to whether the target user device 82-1/user 80-1 is authorized based on the message sent from the interrogator device 62 in step 524.

Figure 4:
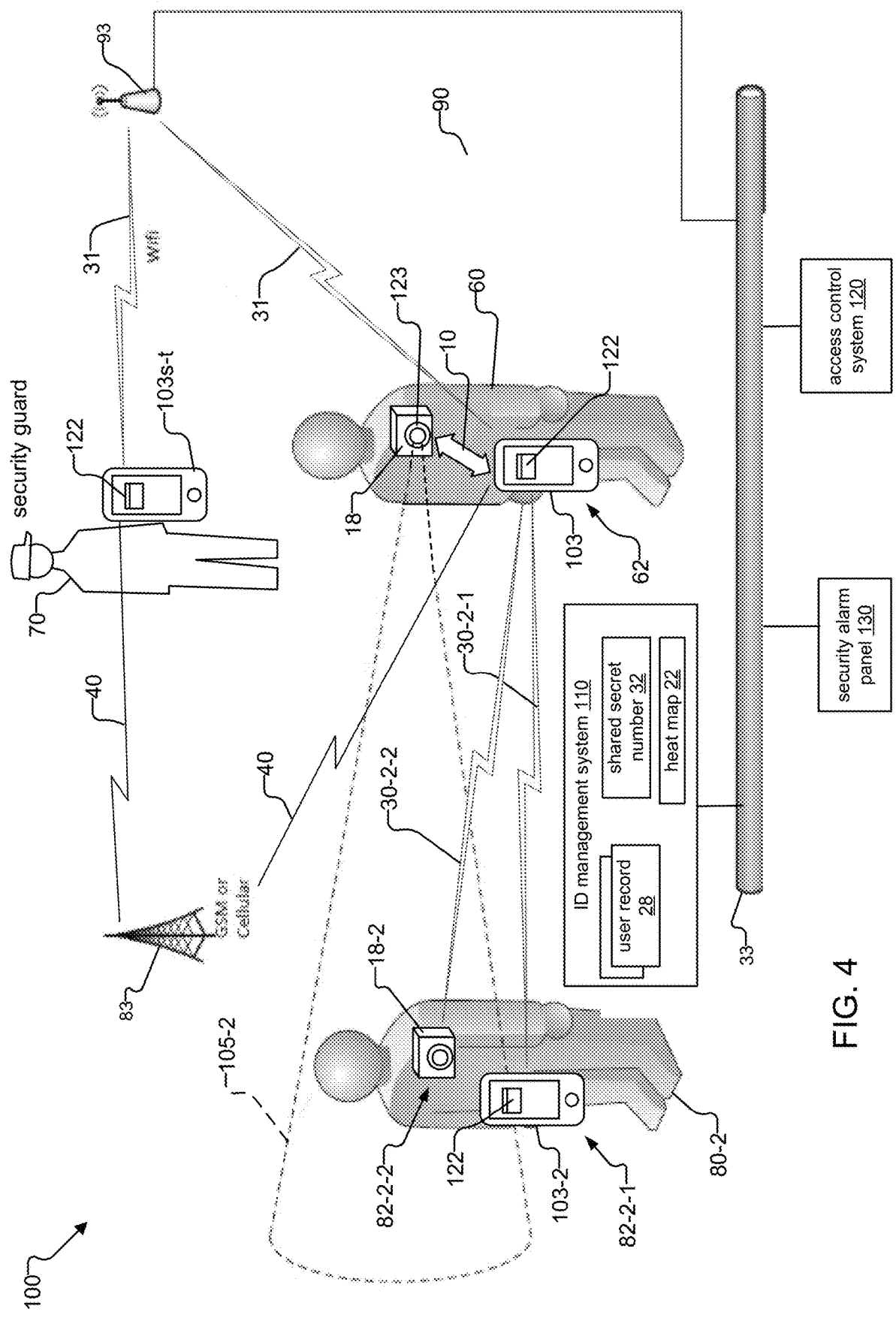
FIG. 4 is a schematic diagram showing another interaction between an interrogator device and a user in the security system to determine whether the user is authorized, where the user is carrying both a smart phone target user device and an auxiliary device (e.g. smart badge) target user device.

FIG. 4 shows another interaction between an interrogator device 62 and a user 82 in the security system 100. Here, user 82-2 is carrying both a smart phone 103-2 as a first target user device 82-2-1 and is also carrying an auxiliary device 18-2 (e.g. smart badge) as a second target user device 82-2-2. The interrogator device 62 senses the target user devices 82-2-1 and 82-2-2, and sends challenge beacons 30-2-1 and 30-2-2 to trigger responses from the target user devices 82-2-1 and 82-2-2, respectfully.

In the illustrated example, the auxiliary device 18 carried by the interrogator 60 includes a camera system 123 that can capture images of the user 80-2 within a field of view 105-2 of the camera system 123. Otherwise, the security system 100 includes similar components and operates in a similar manner as that illustrated in FIG. 1A/1B.

Figure 5:
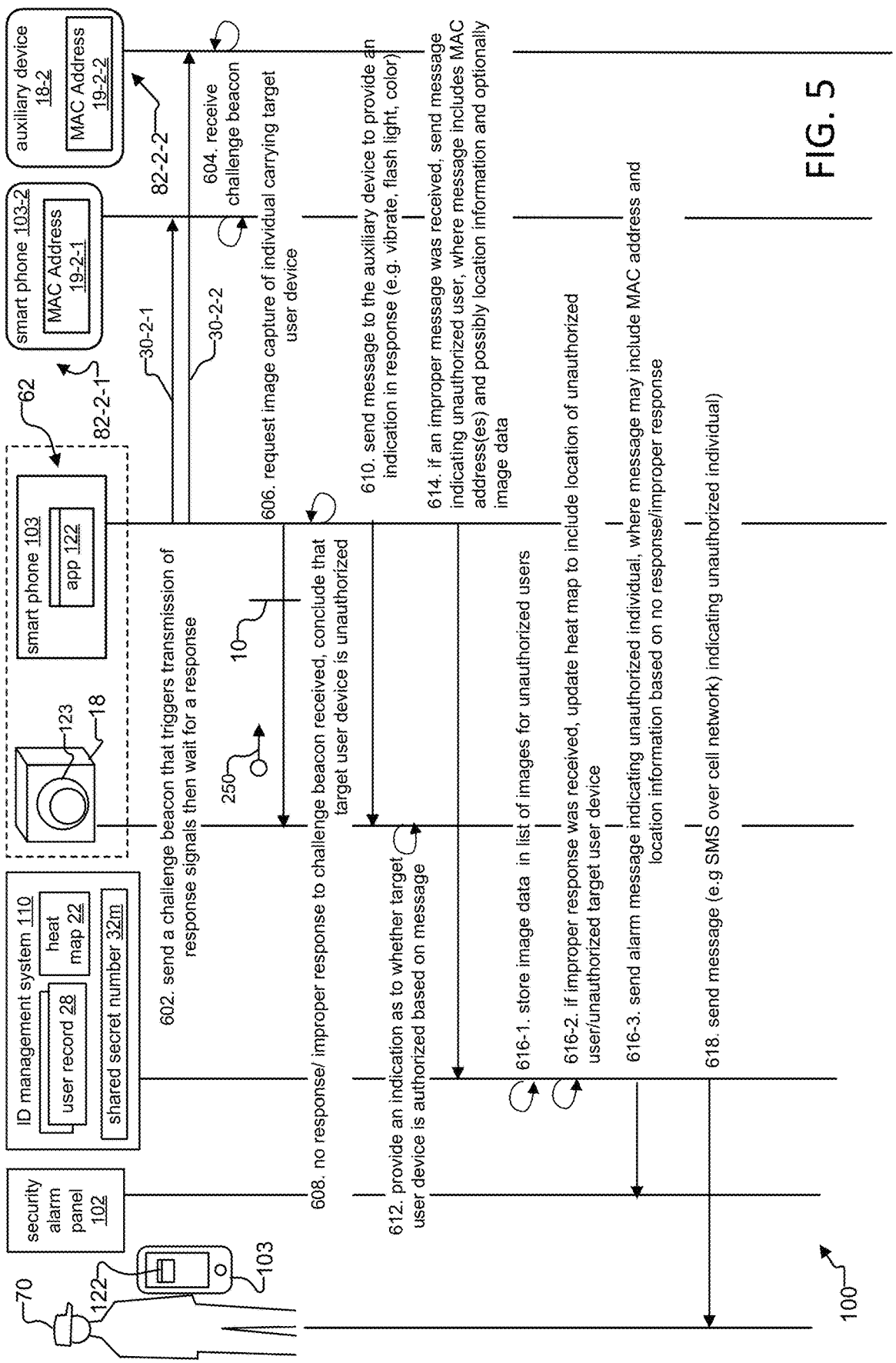
FIGS. 5 and 6 are sequence diagrams that illustrate operation of the security system of FIG. 4.

FIG. 5 is a sequence diagram that illustrates operation of the exemplary security system 100 of FIG. 4. The diagram shows how an interrogator 60 carrying an interrogator device 62 can send challenge beacons 30-2-1 and 30-2-2 for triggering a response in multiple target user devices 82-2-1 and 82-2-2 carried by user 80-2.

Here, however, the target user devices 82-2-1 and 82-2-2 are not pre-programmed by security personnel of the security system 100 to respond to the challenge beacons 30. As a result, these devices either provide an improper/unexpected response to the challenge beacons 30 or do not respond at all to the challenge beacons 30. Fob 113 functions as the target user device 82-2-1 and includes a unique physical ID such as a Media Access Control (MAC) address 19-2-1. Auxiliary device 18-2 is another target user device 82-2-2 of user 80-2 and includes MAC address 19-2-2.

Steps 602, 604, and 606 of FIG. 5 are substantially similar to steps 502, 504, and 506 of FIG. 2 for sending of challenge beacons 30-2-1/30-2-2 to the target user devices 82-2-1 and 82-2-2, for awaiting responses from the devices, and for the interrogator device 62 requesting that its slaved auxiliary device 18 capture image data 250 of the user 80-2 carrying the target user devices 82-2-1 and 82-2-2.

In step 608, the interrogator device 62 receives no response or an improper response from the target user devices 82-2-1 and 82-2-2. In one example, the challenge beacon 30-2-1/30-2-2 detects MAC addresses 19-2-1/19-2-2 in the response but does not associate it with an expected response to the challenge beacon 30-2-1/30-2-2.

The target user devices 82-2-1 and 82-2-2 may have not responded in the fashion expected by the interrogator device 62, in one example, due to lack of a required security credential/shared secret number 32 within the target user devices 82-2-1 and 82-2-2. Though the target user devices 82-2-1 and 82-2-2 include the necessary firmware/apps 122 to detect the challenge beacons 30-2-1/30-2-2, the firmware/apps 122 do not detect a security credential 50 or shared secret number 32. As a result, the target user devices 82-2-1 and 82-2-2 respond to the challenge beacons 30-2-1 and 30-2-2 with a response message indicating that neither of the target user devices 82-2-1 and 82-2-2 included the required security credential 50 or shared secret number 32.

Alternatively, the target user devices 82-2-1 and 82-2-2 may have not responded at all, due to the fact that the devices may not be running the required apps 122 and/or firmware that enables the target user devices 82-2-1 and 82-2-2 to respond to the challenge beacons 30 in the manner expected by the interrogator devices 62. In any event, due to the lack of response or unexpected responses to the challenge beacons 30-2-1 and 30-2-2, the interrogator device 62 can initially conclude based on the responses that target user devices 82-2-1 and 82-2-2 are unauthorized and therefore that user 80-2 is unauthorized.

In step 610, the interrogator device 62 sends a message to auxiliary device 18 to provide an indication in response to determining whether the user 80-2 is authorized (e.g. vibrate, flash light, color), and the auxiliary device 18 provides the indication based on the message in response at step 612.

If an improper response to the challenge beacons 30-2-1 and 30-2-2 was received, in step 614, the interrogator device sends a message indicating the unauthorized user 80-2 to the ID management system 110. The message includes the MAC addresses 19-2-1 and 19-2-1 and possibly the location information of the target user devices 82-2-1 and 82-2-2, and optionally the image data 250.

According to step 616-1, the ID management system 110 stores the image data 250 in a list of images for unauthorized users. In step 616-2, if an improper response was received, the ID management system 110 updates the heat map 22 to include location of unauthorized user/unauthorized target user devices 80-2/82-2-1 and 82-2-2 based on the location information. Then, in step 616-3, the ID management system 110 sends an alarm message indicating an unauthorized individual to the security alarm panel 102. The message may include MAC address(es) 19-2-1 and 19-2-2 and location information based on whether the interrogator device 62 received no response or an improper response to the challenge beacons 30-2-1 and 30-2-2.

In step 618, the interrogator device 62 can also provide the image data 250 (or perhaps just a thumbnail image) of the unauthorized user 80-2 to security personnel 70, such as by sending the image data 250 in an SMS text message over the cellular link 40 for display on the smart phone 103 of security guard 70.

Figure 6:
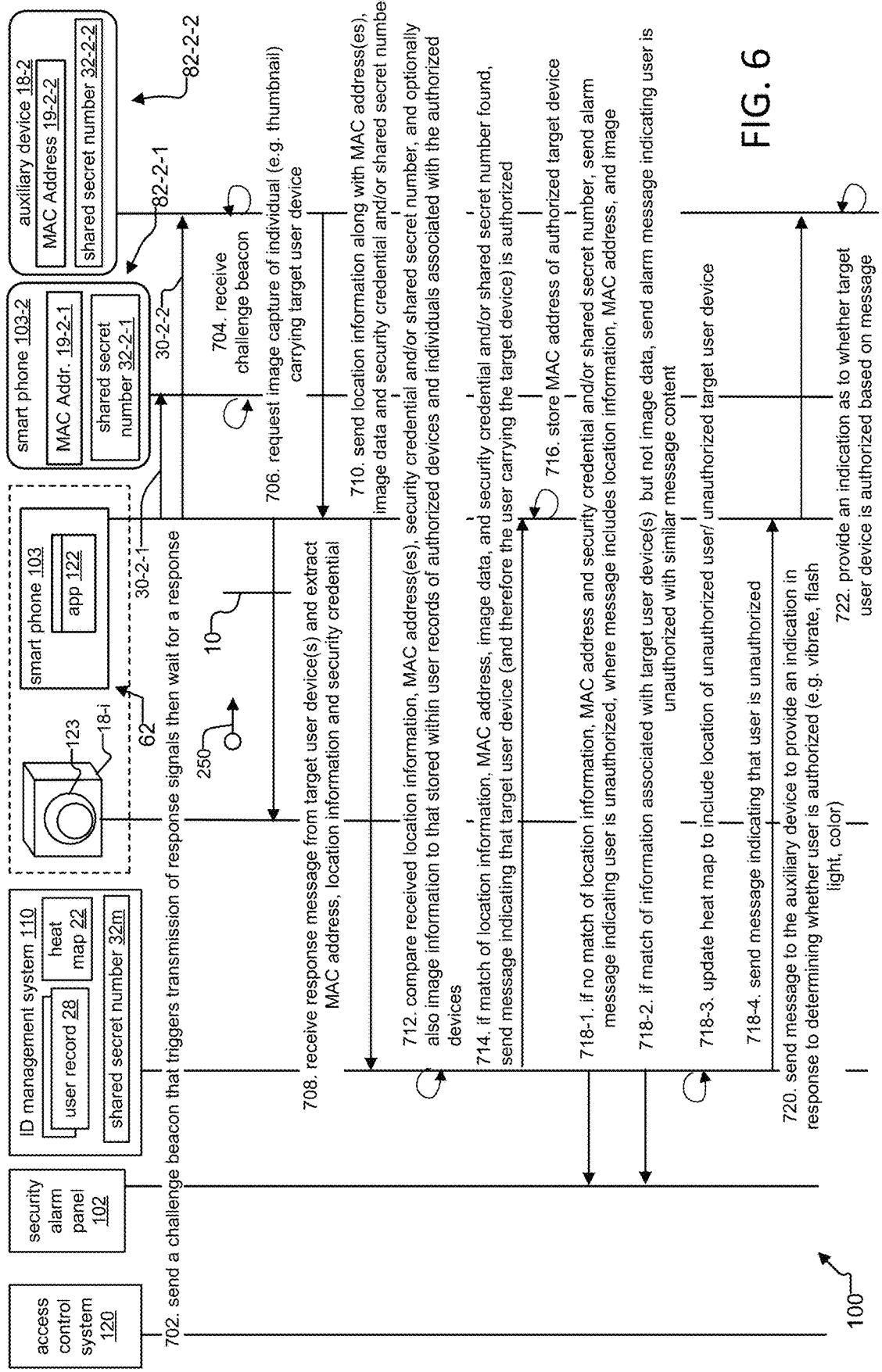

FIG. 6 is a sequence diagram that also illustrates operation of the exemplary security system 100 of FIG. 4. Unlike the diagram of FIG. 5, the target user devices 82-2-1 and 82-2-2 are pre-programmed to both transmit and receive challenge beacons 30. The target user devices 82-2-1 and 82-2-2 also include shared secret numbers 32-2-1 and 32-2-2, respectively, and provide an expected response to challenge beacons 30-2-1 and 30-2-2.

In addition, FIG. 6 shows that an auxiliary device 18-2 carried by the user 80-2 (rather than an auxiliary device 18 carried by the interrogator 60 as in FIG. 2) can receive messages sent from the interrogator devices 62. The messages indicate whether the users 60 of the target user devices 82 are authorized. The auxiliary devices 18-2 carried by user 80-2 can then provide an indication (e.g. produce a vibration, render a color and/or flash a light in a specific pattern at different rates) as to whether the users 80 of the target user devices 82 are authorized in response to receiving the messages.

Steps 702, 704, and 706 of FIG. 6 are substantially similar to steps 602, 604, and 606 of FIG. 2 for sending of challenge beacons 30-2-1/30-2-2 to the target user devices 82-2-1 and 82-2-2, for awaiting responses from the devices, and for the interrogator device 62 requesting that its slaved auxiliary device 18 capture image data of the user 80-2 carrying the target user devices 82-2-1 and 82-2-2.

In step 708, the interrogator device 62 receives response messages from target user device(s) 82-2-1/82-2-2 and extracts MAC address(es) 19-2-1/19-2-2, location information and shared secret numbers 32-2-1/32-2-2, and sends this information for validation by the ID management system 110 in step 710.

In step 712, the ID management system 110 compares the received location information, MAC address(es) 19-2-1/19-2-2, security credential 50 and/or shared secret number 32-2-1/32-2-2, and optionally also image data 250 to that stored within user records 28 of authorized devices (which here is user record 28-2). If a match of the location information, MAC address(es), image data 250, and security credential 50 and/or shared secret number 32-2-1/32-2-2 is found in step 714, the ID management system 110 sends a message back to the interrogator device 62 indicating that target user device(s) 82-2-1/82-2-2 (and therefore the user 80-2 carrying the target devices) is authorized. The interrogator device 62 stores the MAC addresses 19-2-1/19-2-2 of the authorized devices in step 716.

However, if no match of location information, MAC address and security credential and/or shared secret number is found in step 718-1, the ID management system 110 sends an alarm message indicating user 80-2 is unauthorized, where the message includes location information, MAC address(es), and image data 250, in examples. Alternatively in step 718-2, if there is a match of the information associated with the target user devices 82-2-1/82-2-2 but not of the image data 250 (which could indicate that the user 80-2 is an impostor), the ID management system 110 sends an alarm message indicating that user 80-2 is unauthorized with similar message content as in step 718-1.

In step 718-3, the ID management system 110 updates heat map 22 to include the location information of the unauthorized target user devices 82-2-1/82-2-2. According to step 718-4, the ID management system 110 then sends a message back to the interrogator device 62 indicating that target user device(s) 82-2-1/82-2-2 (and therefore the user 80-2 carrying the target devices 82-2-1/82-2-2) is unauthorized.

Then, unlike the diagram of FIG. 5, the interrogator device 62 in step 720 sends a message to the auxiliary device 18-2 carried by the user 80-2. The message instructs the auxiliary device 18-2 to provide an indication in response to the determination that user 80-2 is unauthorized, where the indication includes producing a vibration, flashing a light in a particular pattern, or displaying a color, in examples. The auxiliary device 18-2 provides the indication as to whether target user device is authorized based on the message received in step 722. In this way, the user 80-2 is conspicuously placed "on notice" of their unauthorized status so they may remediate the situation and/or also so that the interrogator 60 and other occupants of the building 90 can be alerted to a potential security breach associated with the unauthorized user 80-2.

FIG. 7A-7D show different embodiments of auxiliary devices 18 that could be carried by interrogators 60 and/or users 80.

Figure 7C:
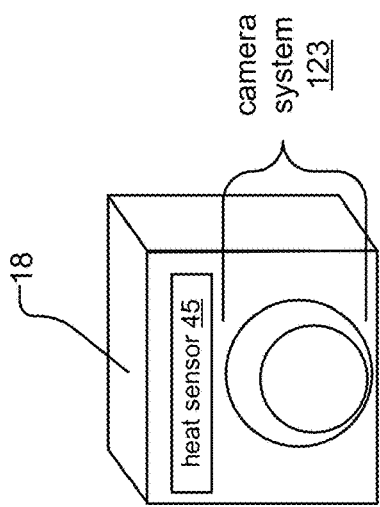
FIG. 7A-7D show different embodiments of auxiliary devices that can additionally be carried or worn by the interrogator carrying the interrogator user device and/or by the user carrying the target user device.
Figure 7B:
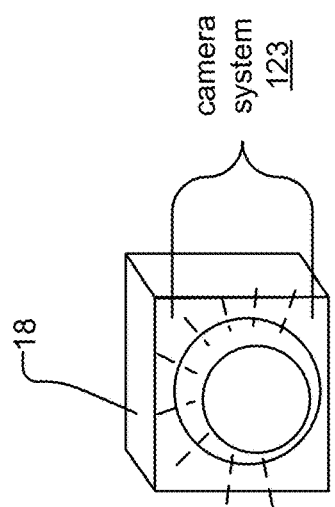
Figure 7D:
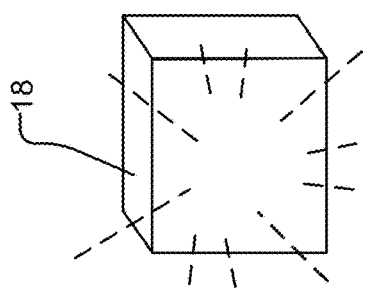
Figure 7A:
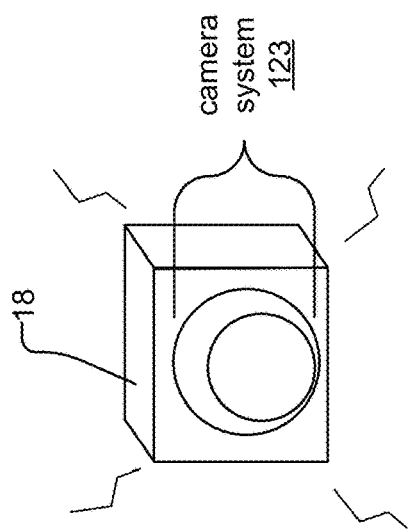

FIG. 7A shows an auxiliary device 18 including a camera system 123. The auxiliary device 18 can also provide an indication as to whether a target user device 82 is authorized. When the auxiliary device 18 is carried by an interrogator 60, in one example, the auxiliary device 18 can produce the illustrated vibration as the indication. The auxiliary device 18 provides the indication in response to receiving a message sent from the interrogator device 62 over local wireless network 10 indicating whether the users 80 of the target user devices 82 are authorized.

FIG. 7B shows another example of an auxiliary device 18 having an integrated camera system 123. The auxiliary device 18 also provides an indication (here, displaying a color within a luminescent ring or band around a lens of the camera system 123) as to whether a target user device 82 is authorized. In one example, the auxiliary device 18 is a "smart badge" carried by the user 80.

FIG. 7C shows yet another example of an auxiliary device 18. The device includes a camera system 123 and a heat sensor 45. FIG. 7D shows still another example of an auxiliary device 18 that flashes light in various patterns as an indication that a user is either authorized or unauthorized. It can also be appreciated that other combinations of heat sensor 25, camera system 123, and indication mechanisms are supported.

Figure 8:
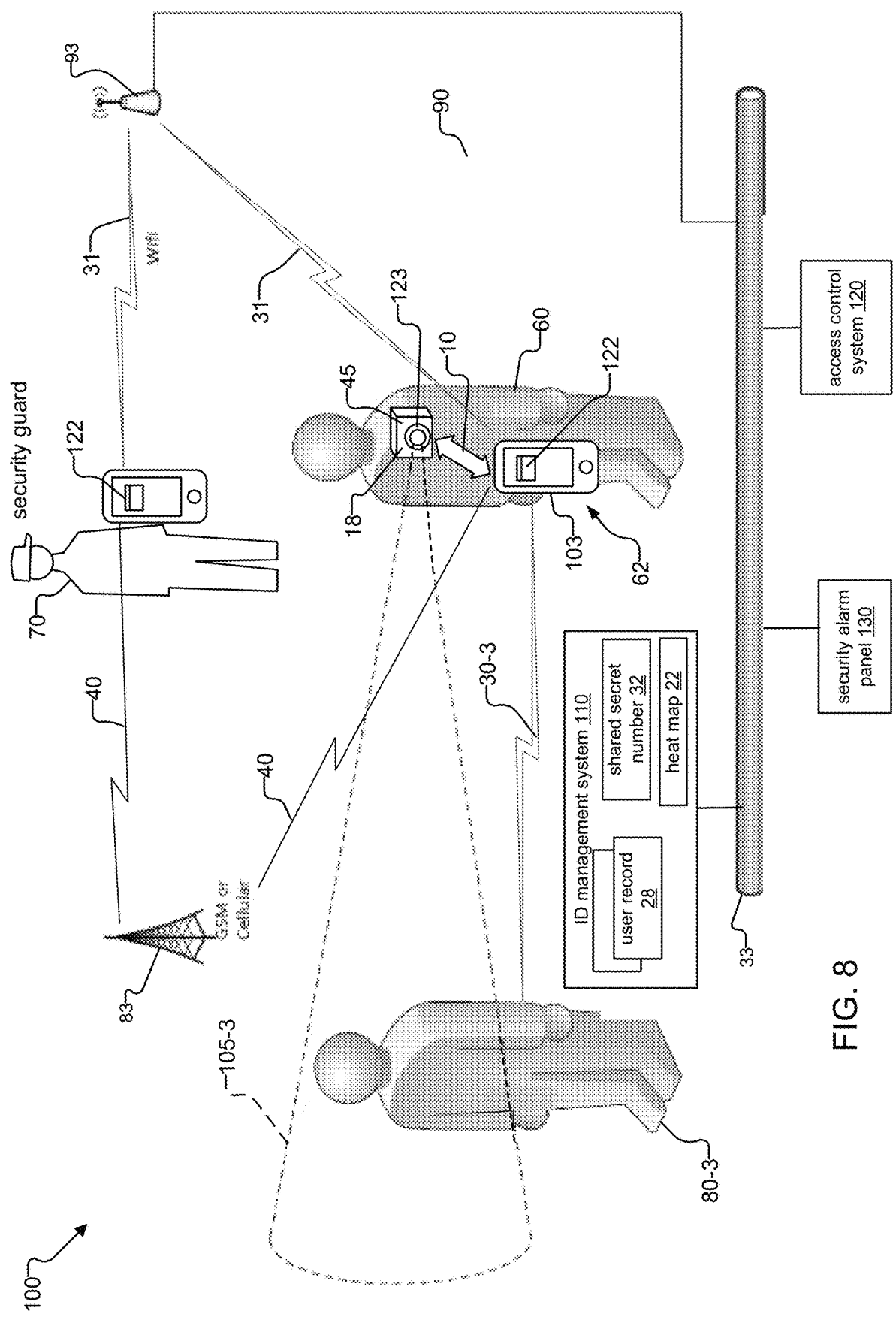
FIG. 8 is a schematic diagram showing yet another interaction between an interrogator device and a user in the security system to determine whether the user is authorized, where the user is not carrying any target user device.

FIG. 8 shows yet another exemplary interaction between an interrogator device 62 and a user 82 in the security system 100, where the user 80-3 being challenged is not carrying any target user device 82. The auxiliary device 18 carried by the interrogator 60 includes a camera system 123 that can capture images of the user 80-3 within a field of view 105-3 of the camera system 123. In addition, the auxiliary device 18 includes a heat sensor 45.

Here, because the auxiliary device 18 includes a heat sensor 45, the interrogator 60 can detect the presence of user 80-3 although the user 80 may not be carrying a target user device 82. After detecting user 80-3 based on the heat signature of the user 80-3, the interrogator device 60 can initiate (or resend) its challenge beacons 30-3. Otherwise, the security system 100 includes similar components and operates in a similar manner as previously described for FIG. 1A, FIG. 1B, FIG. 2 and FIG. 4 included herein above.

Figure 9:
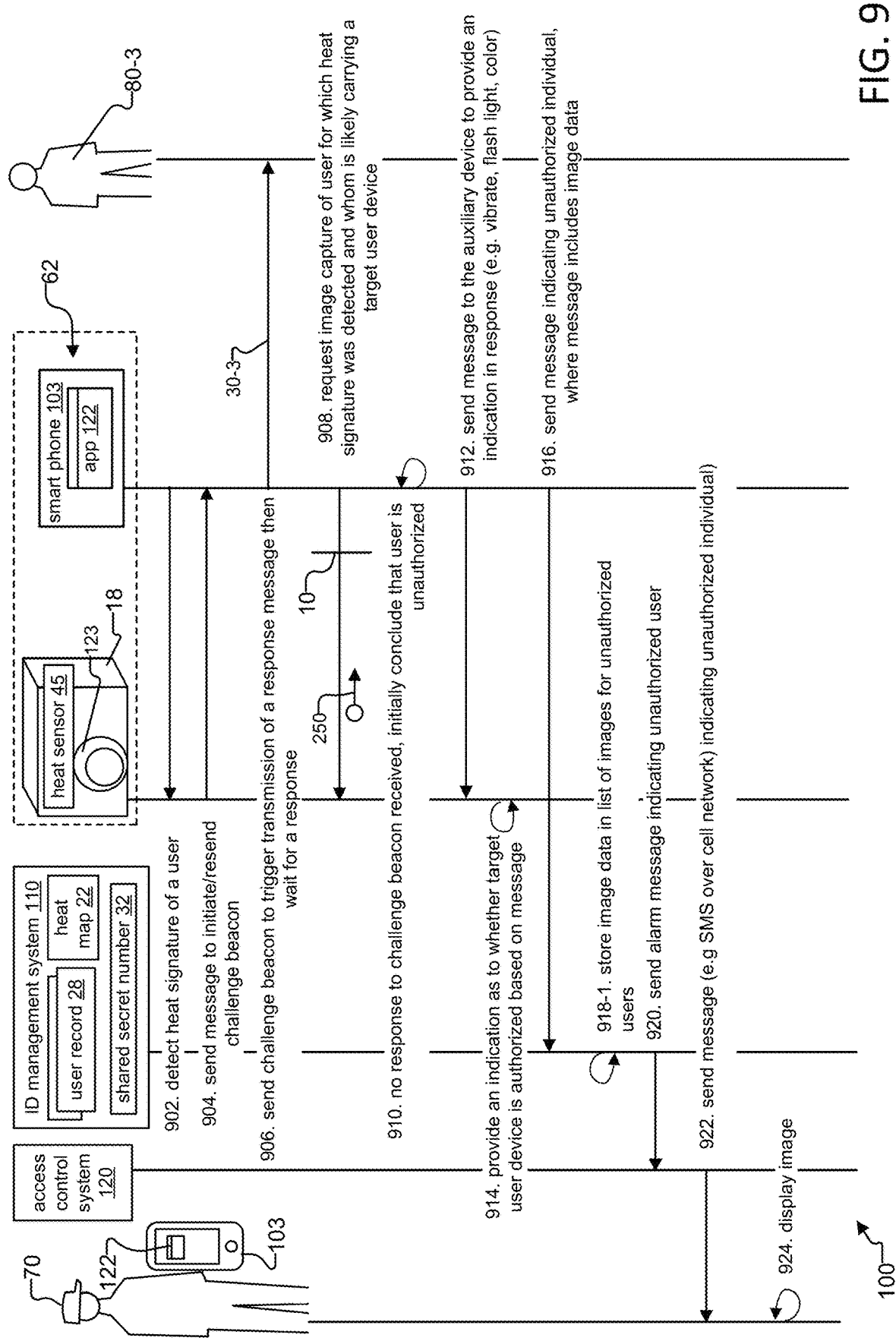
FIG. 9 is a sequence diagram that illustrates operation of the security system of FIG. 8.

FIG. 9 is a sequence diagram that illustrates operation of the exemplary security system 100 of FIG. 8.

In step 902, the interrogator device 62 sends a message over the local wireless interface 10 to auxiliary device 18. The message instructs the auxiliary device 18 to activate its heat sensor 25. The heat sensor then detects a heat signature of user 80-3. In response to detecting the heat signature, the auxiliary device 18 sends a message to the interrogator device 62 to initiate (or resend) a challenge beacon 30-3.

According to step 906, the interrogator device 62 sends a challenge beacon 30-3 to trigger transmission of a response message from a target user device 82 then waits for a response.

In step 908, the interrogator device 62 sends a message to auxiliary device 18 to request image capture of user 80-3 for which the heat signature was detected and is likely carrying a target user device 82.

However, the interrogator device 62 receives no response to the challenge beacon 30-3 in step 910. As a result, the interrogator device 62 can initially conclude that the user 80-3 is unauthorized. The interrogator device 62 in step 912 then sends a message to the auxiliary device 18 to provide an indication in response to determining whether the user 80-3 is authorized (e.g. vibrate, flash light, color), and the auxiliary device 18 provides an indication based on the message in step 914.

In step 916, the interrogator device 62 sends a message to the ID management system 110 indicating the unauthorized user 80-3, where the message includes image data 250 that the auxiliary device 18 captured of the user 80-3. In step 918-1, the ID management system 110 stores the image data 250 in a list of images/image data 250 for unauthorized users 80, and sends an alarm message in step 920 indicating an unauthorized user 80-3 was detected to the access control system 120.

The access control system 120 in step 922 can then send a message such as an SMS message over the cellular network 40 to a security guard 70 indicating that unauthorized user 80-3 was detected. The message can optionally include a thumbnail image of the unauthorized user 80-3 that the ID management system 110 extracts from the image data 250, in one example. The image of the unauthorized user 80-3 can then be displayed on the smart phone 103 of the security guard 70 in step 924.

Figure 10:
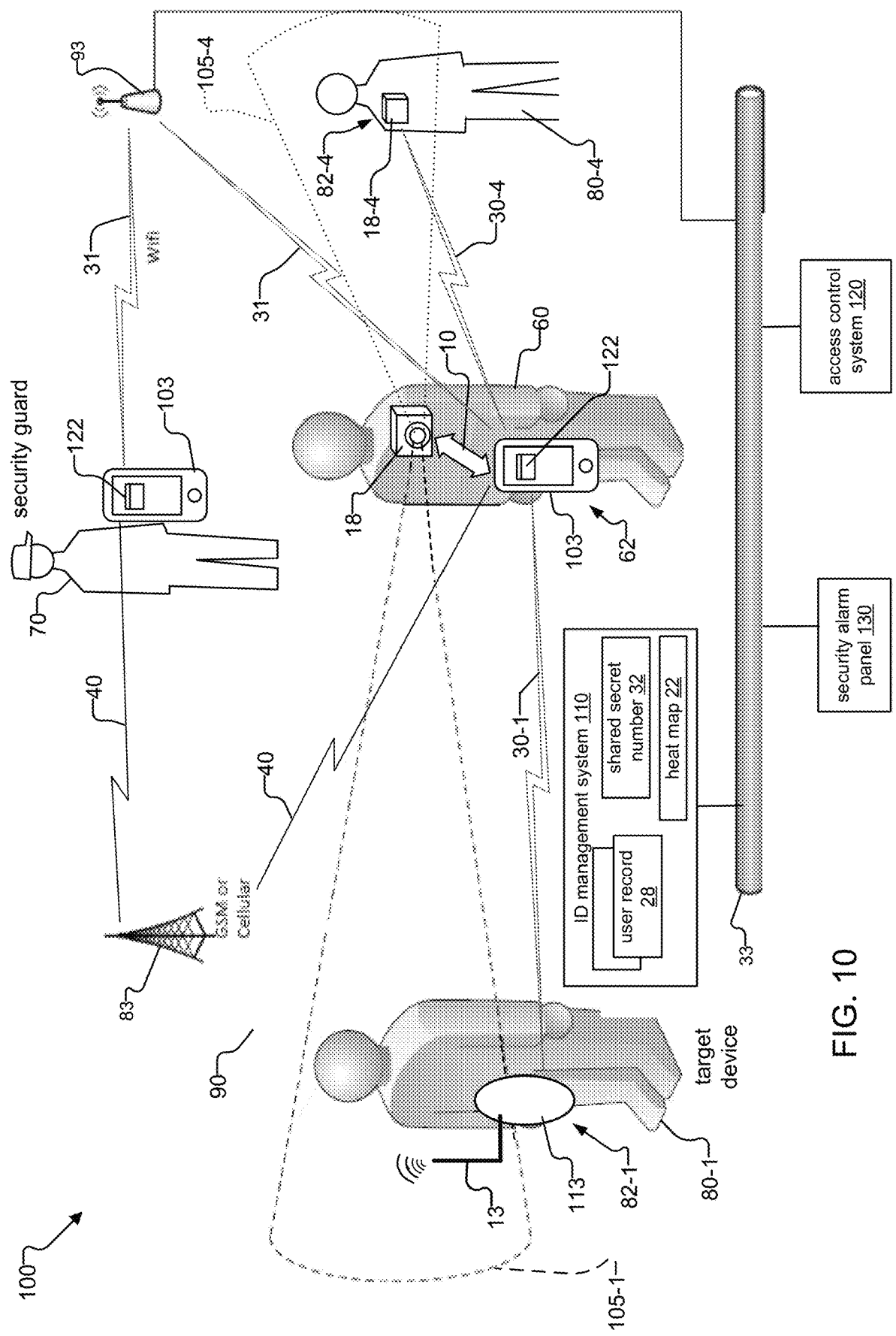
FIG. 10 is a schematic diagram showing still another interaction between an interrogator device and users in the security system to determine whether the users are authorized, where an interrogator device carried by an interrogator interacts with two different users that are each carrying target user devices.

FIG. 10 is a schematic diagram illustrating yet another exemplary interaction between an interrogator device 62 and a user 82 in the security system 100. Here, both users 80-1 and 80-4 are within vicinity of interrogator device 62 worn by the interrogator 60. User 80-1 is carrying a fob 113 device as a target user device 82-1 and is located to the left of the interrogator/interrogator device 60/62. User 80-4 is located to the right of the interrogator/interrogator device 60/62. User 80-4 is carrying a smart badge auxiliary device 18-4 as a target user device 82-4.

In the illustrated example, challenge beacons 30 sent to target user device 82-1 are labeled as challenge beacons 30-1 and challenge beacons sent to target user device 82-4 are labeled as challenge beacons 30-4. Auxiliary device 18 carried by the interrogator 62 includes a camera system 123 that can capture image data 250 of the users 80-1/80-4. The image data 250 for each of the users 80-1/80-4 is captured according to fields of view 105-1/105-4 of the camera system 123.

FIG. 10 also illustrates an issue that can arise with a challenge beacon-based security system 100 when more than one user 82 is within range of the interrogator device 62 sending the challenge beacons 30. In examples, there may be not enough context information associated with the responses to the challenge beacons 30-1/30-4 for the interrogator device 62 to determine which of the users 82 is carrying which of the target user devices 82. As a result, the interrogator device 62 may not be able to detect which of the users 80-1/80-4 are unauthorized.

FIG. 11 is a sequence diagram that illustrates operation of the exemplary security system 100 of FIG. 10. The diagram provides an example of how to address the issue of identifying unauthorized users among multiple users 80 that are each within range of the challenge beacons 30, as presented in the description of FIG. 10 herein above.

In step 1002, the interrogator device 62 sends challenge beacons 30-1/30-4 to trigger transmission of response signals from target user devices 82-1 and 82-4, then waits for a response. In step 1004, the interrogator device 62 receives response messages from target user devices 82-1 and 82-4 and extracts location information, MAC address(es) 19-1/19-4, security credential 50-1 (for user device 82-1) and/or shared secret number 32-4 (for user device 82-4).

To address the issue of how to identify unauthorized users among multiple users 80 each being within range of the challenge beacons 30-1/30-4, in step 1006, the interrogator device 62 can use (e.g. measure) the signal strength of the received responses/RSSI to provide an indication as to where the authorized users 80 are located versus potentially unauthorized users 80. For example, if the interrogator device 62 detects responses coming from both the left and the right side of a hallway for two target user devices 82, and receives responses from the left side for a previously authorized target user device/user 82-1/80-1, the interrogator device 62 can infer that responses for authorized users are coming from the left side of the hallway. As a result, the interrogator device 62 need only challenge users 80-4 located on the right side of the hallway.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for determining authorization of individuals at a premises, the system comprising:
   interrogator devices that are carried through the premises by security personnel and that send challenge beacons for triggering responses from target user devices;
   a management system that confirms whether users of the target user devices are authorized based on the responses received by the interrogator devices; and
   auxiliary devices, which are carried by the security personnel with the interrogator devices, that capture image data of the users carrying the target user devices, wherein the management system additionally confirms whether users of the target user devices are authorized based on the image data, wherein the auxiliary devices are wearable devices that are worn by the security personnel;
   wherein the management system additionally confirms whether users of the target user devices are authorized based on media access control (MAC) addresses of the target user devices.

2. The system of claim 1, wherein the interrogator devices initially conclude whether users of the target user devices are authorized based on the responses from the target user devices.

3. The system of claim 1, wherein the auxiliary devices send the image data to the interrogator devices.

4. The system of claim 1, wherein the image data is provided to security personnel for unauthorized users.

5. The system of claim 1, wherein the management system notifies the interrogation devices in response to confirming whether users of the target user devices are authorized.

6. The system of claim 1, further comprising auxiliary devices that are carried with the interrogator devices that receive messages sent from the interrogator devices indicating whether the users of the target user devices are authorized.

7. The system of claim 6, wherein the auxiliary devices provide an indication as to whether the users of the target user devices are authorized in response to receiving the messages.

8. The system of claim 6, wherein the auxiliary devices receive the messages from the interrogator devices over a wireless radio frequency link.

9. The system of claim 1, further comprising auxiliary devices that are carried with the target user devices that receive messages sent from the interrogator devices indicating whether the users of the target user devices are authorized.

10. The system of claim 9, wherein the auxiliary devices provide an indication as to whether the users of the target user devices are authorized in response to receiving the messages.

11. The system of claim 1, wherein the interrogator devices provide location information of the target user devices, and wherein the management system determines whether the target user devices of the users are authorized based on the location information.

12. The system of claim 1, wherein the interrogator devices use signal strength of the received responses to provide an indication as to where the authorized users are located versus potentially unauthorized users.

13. The system of claim 1, wherein the interrogator devices are carried by a robot.

14. The system of claim 1, wherein the responses include information which indicates that the users of the target user devices are authorized at the premises for a particular day and/or time period.

15. A method for determining authorization of individuals at a premises, the method comprising:
for interrogator devices that are carried through the premises by security personnel, sending challenge beacons from the interrogator devices for triggering responses from target user devices;
confirming whether users of the target user devices are authorized based on the responses received by the interrogator devices; and
additionally confirming whether users of the target user devices are authorized based on image data of the users carrying the target user devices, the image data being captured by auxiliary devices that are carried with the interrogator devices by security personnel, wherein the auxiliary devices are wearable devices that are worn by the security personnel; and
additionally confirming whether users of the target user devices are authorized based on MAC addresses of the target user devices.

16. The method of claim 15, further comprising the interrogator devices initially concluding whether users of the target user devices are authorized based on the responses from the target user devices.

17. The method of claim 15, wherein sending challenge beacons from the interrogator devices for triggering responses from target user devices is accomplished using wireless radio frequency signals.

18. The method of claim 15, further comprising the auxiliary devices that are carried with the interrogator devices receiving messages sent from the interrogator devices indicating whether the users of the target user devices are authorized.

19. A system for determining authorization of individuals, the system comprising:
interrogator devices that are carried through the premises by security personnel and that analyze responses from target user devices; and
auxiliary devices, which are carried with the interrogator devices by security personnel, that capture image data of the users carrying the target user devices, wherein it is confirmed that the users of the target user devices are authorized based on the image data and the auxiliary devices are wearable devices that are worn by the security personnel; and it is additionally confirmed whether users of the target user devices are authorized based on MAC addresses of the target user devices.

20. A system for determining authorization of individuals at a premises, the system comprising:
interrogator devices that are carried through the premises and that send challenge beacons for triggering responses from target user devices;
a management system that confirms whether users of the target user devices are authorized based on the responses received by the interrogator devices; and
auxiliary devices, which are carried by the security personnel with the interrogator devices, that capture image data of the users carrying the target user devices, wherein the management system additionally confirms whether users of the target user devices are authorized based on the image data and MAC addresses of the target user devices.

* * * * *